United States Patent [19]

Taig

[11] Patent Number: 4,641,733
[45] Date of Patent: * Feb. 10, 1987

[54] DISABLING DEVICE FOR A BRAKE CONTROL DEVICE

[75] Inventor: Alistair G. Taig, South Bend, Ind.

[73] Assignee: Allied Corporation, Morristown, N.J.

[*] Notice: The portion of the term of this patent subsequent to Aug. 6, 2002 has been disclaimed.

[21] Appl. No.: 706,210

[22] Filed: Feb. 27, 1985

[51] Int. Cl.4 .............................................. B60K 41/24
[52] U.S. Cl. ................................ 192/13 A; 192/3 H; 74/478.5
[58] Field of Search ............... 192/13 A, 3 H; 74/478, 74/478.5

[56] References Cited

U.S. PATENT DOCUMENTS

| | | | |
|---|---|---|---|
| 1,927,209 | 9/1933 | Gilmore | 192/13 A X |
| 1,965,459 | 7/1934 | Fischer | 192/13 A |
| 2,148,498 | 2/1939 | Pilblad | 192/13 A |
| 2,200,878 | 5/1940 | Farris | 192/13 A |
| 2,214,776 | 9/1940 | Pilblad et al. | 192/13 A |
| 2,251,787 | 8/1941 | Gardiner | 192/13 A X |
| 4,533,028 | 8/1985 | Taig | 192/13 A |

FOREIGN PATENT DOCUMENTS

| | | | |
|---|---|---|---|
| 110303 | 6/1984 | European Pat. Off. | |
| 3425956 | 1/1985 | Fed. Rep. of Germany | |
| 2144187 | 2/1985 | United Kingdom | 192/13 A |

Primary Examiner—Rodney H. Bonck
Assistant Examiner—David A. Testardi
Attorney, Agent, or Firm—Larry J. Palguta; Ken C. Decker

[57] ABSTRACT

A brake control device (20, 220) is disposed between a brake pedal (12, 212) and a clutch pedal (10, 200) to retain the brake pedal (12, 212) in an applied position when the clutch pedal (10, 200) is depressed and the vehicle disposed on an incline, so that the vehicle operator may remove his foot from the brake pedal (12, 212). The disabling device (107, 245) may be selectively actuated to prevent the brake control device (20, 220) from operating during certain predetermined circumstances.

10 Claims, 5 Drawing Figures

DISABLING DEVICE FOR A BRAKE CONTROL DEVICE

The present invention relates to a disabling device for a brake control device wherein a vehicle with a clutch pedal and a brake pedal includes a locking device to retain the brake pedal in an applied position when the clutch pedal is depressed and the vehicle disposed on an incline and the vehicle operator removes his foot from the brake pedal. The disabling device may be selectively actuated in order to prevent the brake control device from operating during certain predetermined circumstances.

In U.S. Pat. Nos. 4,533,028; 4,538,710; and 4,582,184 incorporated by reference herein, a brake control device has been disclosed which automatically prevents a vehicle from rolling backwards down an incline when the clutch pedal is depressed and the vehicle operator's foot has been moved after a brake application to an accelerator pedal. Thereafter, when the clutch pedal is released, the brake control device simultaneously releases the brake pedal so that the vehicle is free to continue movement up the incline as the vehicle operator accelerates the vehicle. The brake control device includes a connecting member which moves with the brake pedal during each brake application, and the connecting member is carried by the housing in a manner that permits effortless movement of the connecting member while reducing noise or chatter associated with the movement thereof.

There are at least two circumstances where it would be desirable to prevent the brake control device from operating. First, if the vehicle is disposed on a downhill incline and the operator wishes to operate the vehicle in reverse down the incline, while the vehicle is moving backwardly down the incline the ball contained within the brake control device would move into it's operative position. When the brake pedal and clutch pedal are depressed simultaneously in order to stop the vehicle and disengage the clutch, the brake control device would operate. It is desirable that the brake control device not operate when the vehicle is being operated in reverse down an incline. Also, if the vehicle is being operated in reverse and disposed on level ground, when the vehicle is suddenly braked the deceleration or sudden stopping of the vehicle will cause the ball to operate in the same manner as if the vehicle were disposed on an uphill incline, that is, the ball will roll up the ramp disposed in the housing and become wedged between the connecting member and the housing when the brake pedal and the clutch pedals are depressed. Thus, it is desirable to avoid operation of the brake control device in response to deceleration when the vehicle is moving in reverse gear.

The present invention comprises a disabling device for the brake control device of a vehicle including a brake pedal and a clutch pedal, the brake control device containing a housing fixedly disposed relative to the vehicle and defining an opening therein, a connecting member carried within the opening and operatively coupled to the brake pedal, a linkage assembly extending into the opening and operatively coupled to the clutch pedal and locking means carried within the opening to automatically lock the connecting member to the housing when the clutch pedal is depressed and the vehicle disposed on an incline. The housing includes at least one cover closing one end of the opening, and the cover includes a pair of integral and flexible fingers extending in the opening to resiliently support the connecting member for movement in the opening. The disabling device comprises either an electromagnetic device mounted adjacent the ball's inoperative position in order to retain the ball in the inoperative position when the electromagnetic device is actuated, or connection means operatively connected to the linkage assembly in order to disengage the operative coupling between the linkage assembly and clutch pedal so that the linkage assembly is not displaced with the clutch pedal when the clutch pedal is depressed, and thereby disabling any operation of the linkage assembly and preventing the ball from moving into it's operative position.

It is an advantage of the present invention that either the ball or the linkage assembly may be prevented from operating when predetermined circumstances occur or whenever the vehicle operator so desires.

The invention is described in detail below with reference to the drawings which illustrate the embodiments, in which.

Figure 1:
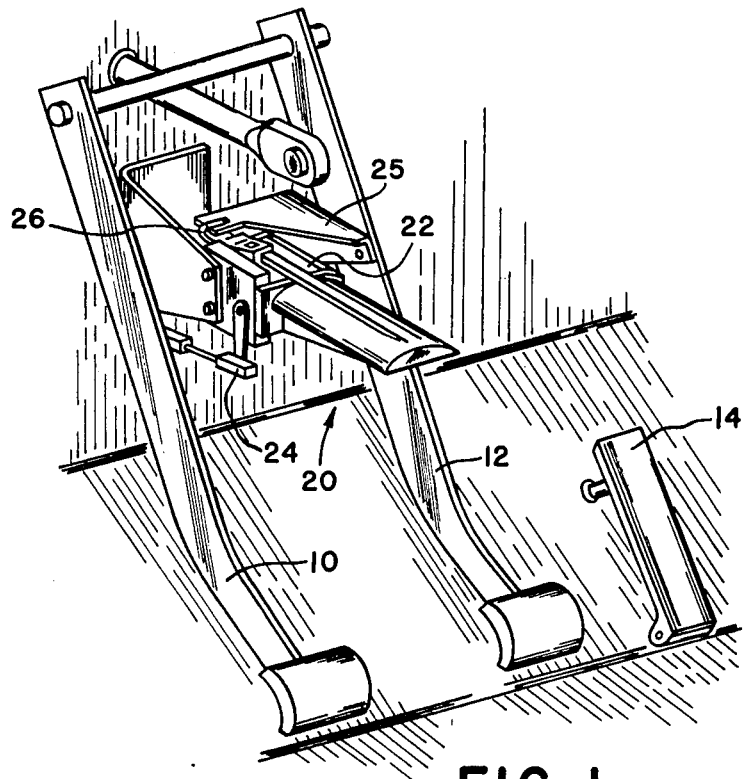
FIG. 1 is a perspective view of the arrangement for a clutch pedal, a brake pedal and accelerator of a vehicle which is equipped with the brake control device.
Figure 2:
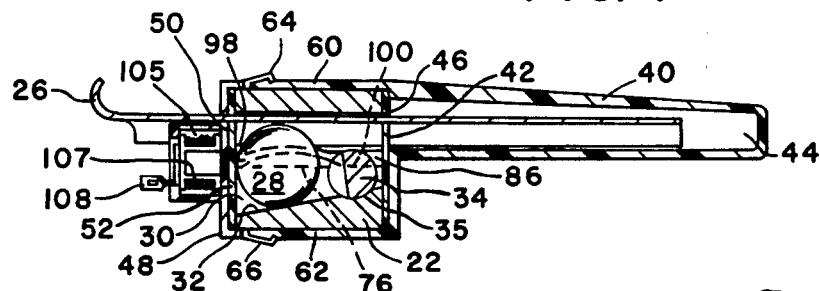
FIG. 2 is a cross sectional view of the brake control device with the electromagnetic coil actuated.
Figure 3:
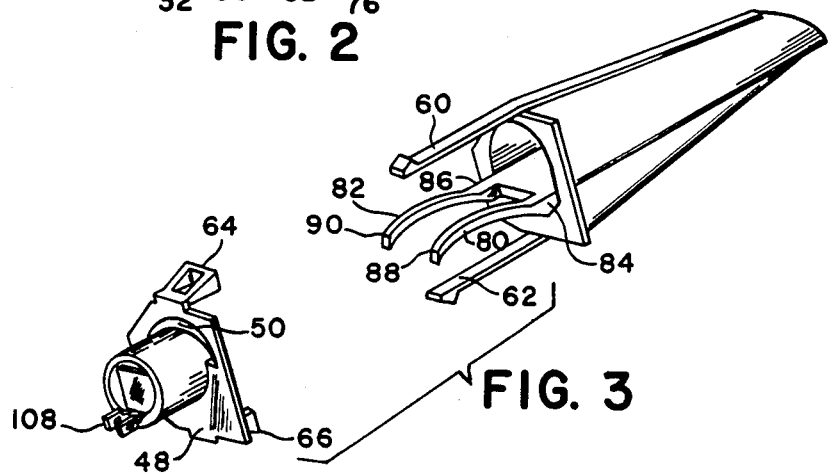
FIG. 3 is an exploded perspective view of the pair of covers.

A vehicle equipped with a standard transmission includes a clutch pedal 10 operable to disengage the transmission from the motor to permit shifting of gears in the transmission. A brake pedal 12 is operable to control actuation of the vehicle brake system, and an accelerator pedal 14 controls the vehicle speed. If the vehicle is stopped on an incline, the vehicle operator will normally position one foot on the clutch pedal to disengage the transmission and the other foot on the brake pedal to hold the vehicle stationary on the incline. When it is time to continue up the incline, the foot on the brake pedal must be moved to the accelerator to increase the engine speed at the same time the clutch pedal is returned to its rest position. This procedure is awkward at times because the vehicle immediately moves backward once the foot on the brake pedal is seperated therefrom to release the brake system. In order to overcome this predicament, a brake control device 20 is mounted on the vehicle between the brake pedal 12 and the clutch pedal 10. The brake control device includes a housing 22 fixed relative to the vehicle, a linkage assembly 24 coupled to the clutch pedal 10 and a connecting member 26 coupled to the brake pedal via a bracket 25. As shown in FIG. 2, a ball 28 is moveably disposed within the housing in an opening 30 extending therethrough. The surface 32 formed in the opening is slanted so that when the vehicle is on a flat level surface, the ball 28 will remain at one end of the opening spaced from the connecting member 26. Conversely, when the vehicle is disposed on an uphill incline, the ball 28 is free to move along the surface into a wedge fit between the connecting member 26 and housing 22. In order to control operation of the ball 28, the linkage assembly 24 includes a cam 34 extending into the opening 30 via bore 35 to oppose the ball 28. Because the linkage assembly is coupled to the clutch pedal 10, the cam 34 is movable in response to movement of the clutch pedal from a first position preventing engagement with both the connecting member 26 and the housing 22 to a second position (as illustrated in FIG. 2) permitting engagement therebetween. The cam 34 permits engagement for the wedge fit between the ball 28 and connecting member 26 when the clutch pedal is depressed and prevents engagement for the wedge fit when the clutch pedal is in its rest position. As a result, the vehicle will be stopped on an incline by the brake control device only when the clutch pedal 10 is depressed.

The housing 22 includes a first cover 40 sealingly closing one end of the opening 30 via a gasket 42. The first cover 40 defines a passage 44 receiving connecting member 26 while the gasket 42 defines an arcuate opening 46, receiving the connecting member 26. The housing 22 includes a second cover 48 with an arcuate opening 50 through which the connecting member extends outwardly of the housing and a gasket 52 cooperates with the second cover and the connecting member 26 to enclose the opening 30. In order to couple the covers together, each cover forms a pair of arms 60, 62 for cover 40 and 64, 66 for cover 48. Arm 60 cooperates with arm 64 to define a releasable latch permitting the arms 60, 64 to be snapped together for locking cover 40 to cover 48. Similarly, arm 62 cooperates with arm 66 to define a releasable latch permitting the arms 62, 66 to be snapped together for locking cover 40 to cover 48.

The opening 30 forms a pair of shoulders 76 for a pair of fingers 80, 82 to rest thereon. The first cover 40 includes a pair of integral and flexible fingers 80, 82 which extend into opening 30. A rigid portion 84, 86 of the fingers 80, 82 is engagable with the shoulders 76 to locate the fingers in the opening 30. Flexible portions 88, 90 of the fingers 80, 82 extend arcuately in a longitudinal direction on each side of ball 28 to slidably engage the connecting member at the edges thereof. Consequently, the fingers 80, 82 resiliently retain the connecting member 26 for sliding engagement through the housing 22.

The second cover 48 is provided with tabs 98 extending into the opening 30 to engage shoulders 76 and locate the second cover relative to opening 30. In addition, the tabs 98 oppose the fingers 80, 82 to prevent the fingers from flattening out against shoulders 76 in response to the weight or movement of the connecting member 26.

The cam 34 is provided with a pair of annular slots 100 receiving rigid portions 84 and 86 of fingers 80 and 82, so that the fingers prevent the cam from separating from the housing 22 when the covers 40 and 48 are snapped together.

The brake control device is made in accordance with the brake control device disclosed in U.S. Pat. No. 4,582,184, incorporated by reference herein, and operates in the same manner described therein.

Refering to FIG. 2, the housing cover 48 includes a cavity 105 which has an electromagnetic coil 107 disposed therein. The electromagnetic coil has terminals 108 extending therefrom, and is connected to an appropriately controlled power source (not shown).

When the vehicle is being operated in reverse and moving along a downhill incline, it is desirable that the brake control device 20 not operate when the operator of the vehicle depresses the brake pedal and clutch pedal in order to come to a stop. Therefore, the electromagnetic coil 107 is connected to a circuit (not shown) having therein a switch connected to the reverse light switch so that when the vehicle is shifted into reverse gear, and the reverse light switch is operated, the circuit provides electrical current to the electromagnetic coil 107 in order to energize coil 107 and hold the ball 28 in the inoperative position shown in FIG. 2. Thus, whenever the vehicle is shifted into reverse, the electromagnetic coil 107 operates in response thereto and maintains the ball in the inoperative position.

The circuit connected to the electromagnetic winding 107 may include a switch which the vehicle operator may actuate at any time, the switch closing the circuit so that the electromagnetic coil 107 is energized and the ball 28 retained in the inoperative position shown in FIG. 2. Thus, the vehicle operator may disable the brake control device 10 for any given period of time.

Figure 4:
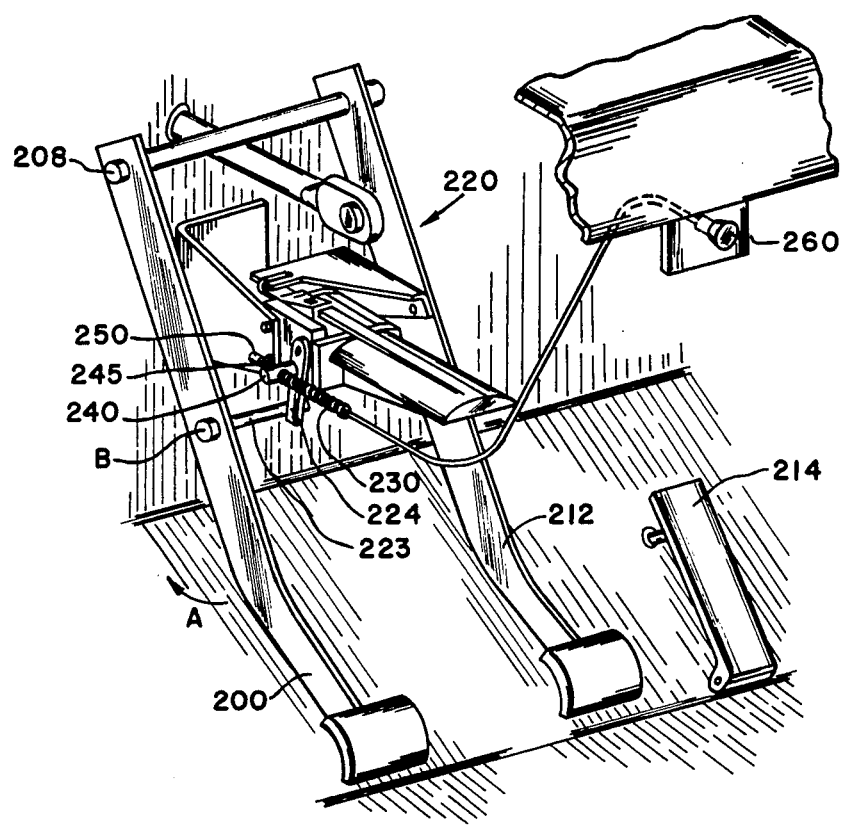
FIG. 4 is a perspective view of the clutch pedal, brake control device, and connection means for disabling the operative engagement between the control device and clutch pedal.
Figure 5:
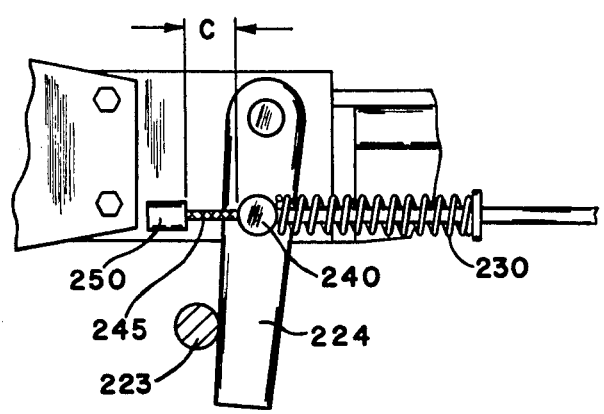
FIG. 5 is a partial side view of the device of FIG. 4.

Referring to FIG. 4, an alternative embodiment illustrates the brake control device 220 having a lever 224 comprising a part of the linkage assembly and biased into engagement with pinion 223 extending from the clutch pedal 200. A spring 230 biases the linkage arm 224 against the pinion 223. Post 240 extends from the linkage arm 224 and includes an opening receiving therein a wire 245. The wire 245 has a fixed stop 250 attached at one end and the other end received by operating button 260. In normal operation, the clutch pedal 200 is depressed in direction of arrow A, the clutch pedal 200 being pivioted about pin 208, with a corresponding but smaller displacement of the post 240 because of its short distance from the pin 208. In other words, there is a small displacement of clutch pedal 200 at point B on clutch pedal 200, whereby depression of clutch pedal 200 does not cause stop 250 to engage post 240. The distance C (FIG. 5) provides for free movement of the clutch pedal 200 without engagement of post 240 with the stop 250. However, if the vehicle operator should choose to disengage the brake control device at any time, the operator may simply pull the button 260 a predetermined distance outwardly so that stop 250 engages post 240 and will prevent the arm 224 from following along in continuous engagement with the pinion 223 when clutch pedal 200 is depressed. The button 260 may have any of a number of constructions or designs to maintain it in an outwardly extending or locking position. When the vehicle operator wishes to reengage the brake control device, the operator merely unlocks the button 260 to allow stop 250 to be displaced away from post 240 and reestablish clearance C so that the arm 224 will be free to move with the clutch pedal 200 when it is depressed.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims are equivalents of the invention.

I claim:

1. A mechanical brake control device for a vehicle which includes a brake pedal and a clutch pedal, the device being compactly disposed substantially between said pedals and comprising, in combination, a housing with a bore therethrough, a connecting member movably disposed within said bore and operatively coupled to said brake pedal for movement therewith, a ball cooperating with said housing and said connecting member to selectively lock said connecting member to said housing, and a control assembly extending from said housing to said clutch pedal, said control assembly cooperating with the ball to maintain the ball in an inoperative position when said clutch pedal is in a rest position, said control assembly permitting said ball to move to an operative position when said clutch pedal is moved away from the rest position, and said ball being movable independently to an operative position solely in response to an angular elevation of the vehicle away from a horizontal setting, the ball directly engaging said connecting member and said housing in a wedging relation in the operative position to fix said connecting member in one direction relative to said housing when said brake pedal and said clutch pedal are moved away from their respective rest positions so that said brake pedal is retained in an applied position until said clutch pedal is returned to its rest position, thereby enabling a vehicle to remain stationary in the angular elevation without requiring the vehicle operator to hold said brake in the applied position, and means for selectively preventing said ball from moving to an operative position when said clutch pedal is moved away its rest position.

2. The mechanical brake control device in accordance with claim 1, wherein said means for preventing said ball from moving comprises an electromagnetic device positioned adjacent the ball in its inoperative position, the electromagnetic device being actuable to exert an attractive force upon the ball and maintain it in the inoperative position when said clutch pedal is moved away from its rest position.

3. The mechanical brake control device in accordance with claim 1, wherein the means for preventing movement of said ball comprises connection means coupled with said control assembly for preventing operation of the control assembly so that said ball may not move to its operative position.

4. The mechanical brake control device in accordance with claim 3, wherein said connection means comprises a wire operatively coupled to said control assembly and resilient means biasing said control assembly into operative engagement with said clutch pedal, the connection means being displacable to a fixed position wherein the fixed position prevents said control assembly from moving with said clutch pedal under the influence of said resilient means.

5. An improved brake control device wherein a vehicle includes a brake pedal and a clutch pedal, the brake control device comprising a housing fixedly disposed to the vehicle and defining an opening therein, a connecting member carried within the opening and operatively coupled to the brake pedal, a linkage assembly extending into the opening and operatively coupled to the clutch pedal, and locking means carried within the opening to automatically lock the connecting member to the housing when the clutch pedal is depressed and the vehicle disposed on an incline, characterized in that said improved brake control device includes means for preventing said locking means from operating so that said locking means does not automatically lock when the clutch pedal is depressed and the vehicle disposed on an incline, the locking prevention means comprising electromagnetic means for exerting an electromagnetic force upon said locking means in order to prevent said automatic locking.

6. The improved brake control device in accordance with claim 5, wherein said locking means comprises a ball and said housing includes a surface upon which said ball is displaced, the electromagnetic means exerting a force upon the ball to prevent movement thereof.

7. The improved brake control device in accordance with claim 5, wherein said housing includes at least one cover closing one end of the opening and the one cover including a pair of flexible fingers extending into the opening to resiliently support said connecting member.

8. An improved brake control device wherein a vehicle includes a brake pedal and a clutch pedal, the brake control device comprising a housing fixedly disposed to the vehicle and defining an opening therein, a connecting member carried within the opening and operatively coupled to the brake pedal, a linkage assembly extending into the opening and operatively coupled to the clutch pedal, and locking means carried within the opening to automatically lock the connecting member to the housing when the cutch pedal is depressed and the vehicle disposed on an incline, characterized in that said improved brake control device includes means for preventing said locking means from operating so that said locking means does not automatically lock when the clutch pedal is depressed and the vehicle disposed on an incline, the locking prevention means including connection means attached to said linkage assembly, said connection means being displacable in order to disengage the operative coupling of the linkage assembly with the clutch pedal.

9. The improved brake control device in accordance with claim 8, wherein the connection means comprises a connector attached to said linkage means and having excess length in order to permit movement of the linkage means when the clutch pedal is depressed, displacement of the connector eliminating the excess length and retaining said linkage assembly at an initial position when said clutch pedal is depressed.

10. The improved brake control device in accordance with claim 8, wherein said housing includes at least one cover closing one end of the opening and the one cover including a pair of flexible fingers extending into the opening to resiliently support said connecting member.

* * * * *